(12) United States Patent
Weng

(10) Patent No.: US 7,457,214 B2
(45) Date of Patent: Nov. 25, 2008

(54) METHOD FOR ACCESSING A VARIABLE MEMORY OF AN OPTICAL DISK DRIVE

(75) Inventor: Yih-Shin Weng, Hsin-Chu Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 575 days.

(21) Appl. No.: 10/605,097

(22) Filed: Sep. 9, 2003

(65) Prior Publication Data

US 2004/0184375 A1   Sep. 23, 2004

(30) Foreign Application Priority Data

Mar. 21, 2003   (TW) .............................. 92106412 A

(51) Int. Cl.
*G11B 19/02* (2006.01)
(52) U.S. Cl. .................................. 369/47.34
(58) Field of Classification Search .............. 369/47.34, 369/53.2–53.2
See application file for complete search history.

(56) References Cited

U.S. PATENT DOCUMENTS

| | | | |
|---|---|---|---|
| 4,912,575 A | 3/1990 | Shiosaki | 360/71 |
| 5,063,547 A | 11/1991 | Custers et al. | 369/30.03 |
| 5,559,769 A | 9/1996 | Ando et al. | 369/44.27 |
| 5,758,070 A * | 5/1998 | Lawrence | 709/220 |
| 6,115,343 A * | 9/2000 | Narumi et al. | 369/59.2 |
| 6,185,640 B1 * | 2/2001 | Ross | 710/53 |
| 7,190,648 B2 | 3/2007 | Chang | 369/47.52 |
| 7,231,498 B2 | 6/2007 | Rodeheffer et al. | 711/150 |
| 2002/0181356 A1 * | 12/2002 | Watanabe et al. | 369/47.16 |

* cited by examiner

*Primary Examiner*—Joseph Feild
*Assistant Examiner*—Parul Gupta
(74) *Attorney, Agent, or Firm*—Winston Hsu

(57) ABSTRACT

A method for accessing a variable memory of an optical disk drive includes utilizing the optical disk drive to read and write data of an optical disk, and identifying the type of the data. If the data is CD data, arrange writing variables from a first initial address of the variable memory and reading variables from a second initial address of the variable memory. If the type of the data is DVD data, arrange writing variables from the first initial address of the variable memory and reading variables from the second initial address of the variable memory.

19 Claims, 3 Drawing Sheets

12

| Common reading variables | CD Reading variables | CD Writing variables | DVD Reading variables | DVD Minus writing variables | DVD Plus writing variables | DVD-RAM Reading variables | DVD-RAM Writing variables |

Fig. 1 Prior art

| Common reading variables | | |
|---|---|---|
| CD Reading variables | DVD Reading variables | DVD-RAM Reading variables |
| CD Writing variables | DVD minus Writing variables | DVD plus Writing variables | DVD-RAM Writing variables |

24 — (common reading) 26 — (device-specific), labeled 22

Fig. 2

METHOD FOR ACCESSING A VARIABLE MEMORY OF AN OPTICAL DISK DRIVE

BACKGROUND OF INVENTION

1. Field of the Invention

The present invention relates to a method for accessing a variable memory, and more specifically, to a method for accessing a variable memory of an optical disk drive which conserves memory space.

2. Description of the Prior Art

Recently, in order to satisfy requirements of storing a large amount of data, the capacity of storing media has increased rapidly. Among a variety of storage media available, an optical disk is a kind of storage media with low cost, compact size, long persistence, and high density, giving an optical disk the most potential in the future. Optical disks can be divided into compact discs (CD) and digital versatile disks (DVD). CDs can be divided into standards such as CDDA, VCD, CD-ROM, CD-R, and CD-RW etc., while DVDs can be divided into standards such as DVD-ROM, DVD-R, DVD-RW, DVD+R, DVD+RW, and DVD-RAM etc.

An optical disk drive first identifies the type of an optical disk, sets tip an initial value of some variables required to react the optical disk, and stores these variables into a variable memory. For example, the same variables can he utilized to read CDs of different standards and to write CDs of different standard. In case of DVDs, variables differ according to different standards. For example, the same variables can be utilized to read DVD-ROM, DVD-R, DVD-RW, DVD+R, and DVD+RW, but variables used to write DVD-R and DVD-RW differs from variables used to write DVD+R and DVD+RW. In case of DVD-RAM, the reading variables and writing variables can be utilized to read and write DVD-RAM. Therefore, an optical disk drive predetermines addresses in a variable memory to provide different variables required to read and write optical disks of different types.

Please refer to FIG. 1 showing the data arrangement of a variable memory 12 of a conventional optical disk drive. The optical disk drive (not shown) supports CDDA, VCD, CD-ROM, CD-R, CD-RW, DVD-ROM, DVD-R, DVD-RW, DVD+R, DVD+RW, and DVD-RAM. The variable memory 12 is for storing variables required to read and write optical disks of different types. As shown in FIG. 1, a common reading variable area, a CD reading variable area, a CD writing variable area, a DVD reading variable area, a DVD minus writing variable area, a DVD plus writing variable area, a DVD-RAM reading variable area, and a DVD-RAM writing variable area are predetermined in the variable memory 12. When an optical disk (not shown) is inserted, the optical disk drive identifies the type of the optical disk and sets up an initial value of variables required to read the optical disk and stores these variables at corresponding address in the variable memory 12.

For example, when an optical disk is inserted, the optical disk drive reads general data required to read the optical disk and set up the initial value of variables and stores them into the common variable area of the variable memory 12. If the optical disk is identified as a CD, the optical disk drive sets up reading variables required to read the optical disk and stores them into the CD reading variable area of the variable memory 12. If the optical disk is further identified as a writable CD, the optical disk drive sets up the writing variables required by CD-R/CD-RW and stores them into the CD writing variable area in the variable memory 12. If the optical disk is found to be a DVD, the optical disk drive sets up reading variables required to read the optical disk and stores them into the DVD reading variable area of the variable memory 12. If the optical disk is further identified as being a writable DVD, the optical disk drive sets up the writing variables required by DVD-R/DVD-RW and stores them into the DVD minus writing variable area in the variable memory 12, or sets up the writing variables required by DVD+R/DVD+RW and stores them into the DVD plus writing variable area in the variable memory 12, according to the type of the DVD. If the optical disk is identified as being a DVD-RAM, the optical disk drive sets up reading variables required to read the optical disk and stores them into the DVD-RAM reading variable area of the variable memory 12, or sets up the writing variables required to write the optical disk and stores them into the DVD-RAM writing variable area in the variable memory 12.

As described above, the conventional optical disk predetermines addresses in the variable memory 12 for storing different variables for reading and writing optical disks in different types. The optical disk drive accesses variable areas corresponding to the type of the optical disk in the variable memory 12 when reading or writing optical disks. However, the optical disk can read or write only one optical disk at once, so that when reading or writing an optical disk, the optical disk drive can only access the variable area corresponding to the type of the optical disk, while the other variable areas in the variable memory 12 are invalid but still occupy space. The more types the optical disk drives supports, the larger the required space in the variable memory 12, which causes a waste on memory resources.

SUMMARY OF INVENTION

It is therefore a primary objective of the present invention to provide a method for accessing a variable memory of an optical disk drive to solve the problems mentioned above.

Briefly summarized, a method for accessing a variable memory of an optical disk drive includes utilizing the optical disk drive to read data of an optical disk, identifying the type of the data, arranging reading variables from an initial address of the variable memory if the data is CD data, and arranging the reading variables from the initial address of the variable memory if the data is DVD data. The CD data types are CDDA, VCD, CD-ROM, CD-R, and CD-RW, and the DVD data types are DVD-ROM, DVD-R, DVD-RW, DVD+R, DVD+RW, and DVD-RAM.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 1 illustrates the data arrangement of a variable memory of a conventional optical disk drive.

FIG. 2 illustrates the data arrangement of a variable memory of an optical disk drive according to the present invention.

DETAILED DESCRIPTION

Figure 3:
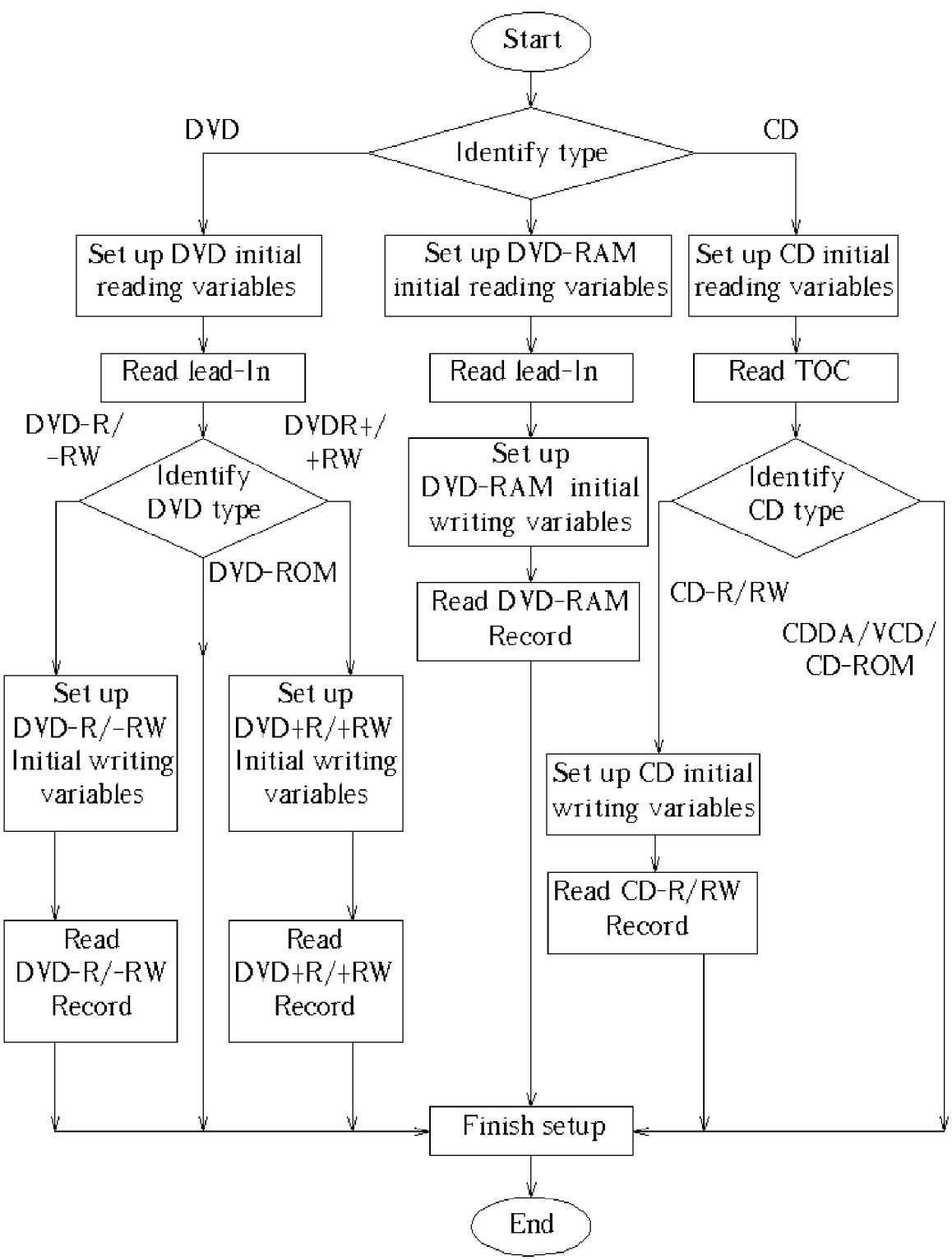
FIG. 3 illustrates a flowchart of setting up variables of different types of optical disks.

Please refer to FIG. 2 showing the data arrangement of a variable memory 22 of an optical disk drive according to the present invention. The optical disk drive (not shown) supports CDDA, VCD, CD-ROM, CD-R, CD-RW, DVD-ROM, DVD-R, DVD-RW, DVD+R, DVD+RW, and DVD-RAM. The variable memory 22 is for storing variables required to read mid write optical disks of different types. Since the optical disk drive reads only one optical disk at once, the variable memory 22 can provide only the variables required to read and write the optical disk inside the optical disk drive, so that the variable memory 22 can be rearranged as shown in FIG. 2. The variable memory 22 utilizes an SRAM of approximately 3 KB, which can be divided into two areas according to the contents of data to be stored. A first area 24, using approximately 1 KB, is for storing common reading variables. A second area 26 is for storing variables required to read and write optical disks of different types. When the optical disk drive reads another disk of a different type, the variables stored in the second area 26 are replaced by new variables. The common reading variables stored in the first area 24 are utilized when reading all kinds of optical disks. Thus, whatever the optical disk drive reads, the data stored in the first area will not be replaced.

Please refer to FIG. 3 showing a flowchart of setting up variables of different types of optical disks. When an optical disk is inserted, the optical disk drive identifies the type of the optical disk. The optical disk types can be divided into CD, DVD-RAM, and DVD. In a case of the disk being identified as a CD, the optical disk drive sets up an initial value of reading variables, reads a table of content (TOC) of the disk, then judges whether the CD is writable or not. If the disk is read-only such as a CD-ROM, the setup is finished. If the disk is writable, such as CD-R and CD-RW, the optical disk drive sets up an initial value of the writing variables and then reads recording data of the disk to finish the setup. In case of the disk being identified as a DVD-RAM, the optical disk drive sets up reading variables of the disk, reads lead-in data, sets up initial value of writing variables, and then reads recording data of the disk to finish the setup. In case of the disk being identified as a DVD, the optical disk drive sets up an initial value of reading variables, reads a lead-in data, and then judges whether the DVD is writable or not. If the disk is read-only such as a DVD-ROM, the setup is finished. If the disk is writable, such as DVD minus and DVD plus, the optical disk drive sets up initial value of the writing variables and then reads recording data of the disk to finish the setup.

Assume that at addresses 8000(H)-8C00(H) in the variable memory 22, the first area 24 uses 8000(H)-83FF(H) for storing common reading variables and the second area 26 uses 8400(H)-8C00H) for storing variables for reading and writing optical disks in different types. When a CD is inserted, the optical disk drive stores necessary reading variables beginning at 8400(H). If the CD is writable, such as CD-R or CD-RW, the optical disk drive stores necessary writing variables beginning at 8700(H). After reading and writing the CD, when a DVD is inserted, the optical disk drive scores necessary reading variables beginning at 8400(H) so that the new reading variables replace the originally stored area. If the DVD is writable such as DVD-R, DVD-RW, DVD+R or DVD+RW, the optical disk drive stores necessary writing variables beginning at 8700(H) so that the new writing variables replace the originally stored area. If a DVD-RAM is inserted, the optical disk drive stores necessary reading variables beginning at 8400(H) so that the new reading variables replace the originally stored are, and the optical disk drive also stores necessary writing variables beginning at 8700(H) so that the new writing variables replace the originally stored area.

As described above, the optical disk drive according to the present invention, stores the reading variables necessary to optical disks of different types in the same address 24 in the variable memory 22, and the writing variables necessary to optical disks of different types in another address 26 in the variable memory 22. When another disk is read, the new reading variables and writing variables will replace those originally stored. Therefore, even if the optical disk drive supports several types of optical disks, only the variable memory 22 of the same capacity is required. The first area 24 of the variable memory 22 is for storing common reading variables and the stored data will not be replaced. The second area 26 of the variable memory 22 is for storing reading and writing variables for different types of optical disks and can be replaced when another disk is inserted. And even the initial address of reading variables and writing variables for different disc type can be different.

In contrast to the prior art, the optical disk drive according to the present invention can utilize the variable memory in an effective manner. Since the optical disk drive can read and write only one optical disk at once, the variable memory for storing reading and writing variables can be repeatedly used. The conventional optical disk drive stores the variables at different addresses so that it requires a variable memory of larger capacity due to the increase of supported types of optical disks, which uses only the variables corresponding to the disk inserted and causes a waste of memory space. The optical disk drive according to the present invention stores the variables at the same address in the variable memory so that even if the optical disk drive supports several types of optical disks, only the variable memory of the same capacity is required, conserving memory space effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a variable memory of an optical disk drive comprising the following steps:
   (a) utilizing the optical disk drive to read data of an optical disk and identifying the type of the disk;
   (b) if the type of the disk is first optical disk, setting up variables at an address of a first area arranged in the variable memory according to the type of the disk; and
   (c) if the type of the disk is second optical disk, setting up variables at the address of the first area arranged in the variable memory according to the type of the disk; and
   wherein an arrangement of the variable memory is predetermined regardless of the type of the disk accessed by the optical disk drive.

2. The method of claim 1 wherein the first optical disk type comprises CDDA, VCD, CD-ROM, CD-R, or CD-RW, and the second optical disk type comprises DYD-ROM, DVD-R, DVD-RW, DVD+R, DVD+RW, or DVD-RAM.

3. The method of claim 1 wherein the variables in step (b) or (c) are reading variables related to content of the optical disk.

4. The method of claim 1 wherein the variables are reading variables, and when the optical disk sets up the reading variables in step (b) or (c) in the variable memory, the reading variables replace reading variables of a last-inserted optical disk set up in the address of the first area arranged in the variable memory.

5. The method of claim 1, further comprising:
   setting up common reading variables necessary for the optical disk drive to access the optical disk into a second area arranged in the variable memory according to the type of the disk;

wherein the common reading variables set up in the variable memory will not be replaced when a different type optical disk is accessed by the optical disk drive.

6. The method of claim 5 wherein the common reading variables include drive configuration, status, or tray status.

7. The method of claim 6 wherein the common reading variables set up in the variable memory will not be replaced when a plurality of optical disks following the optical disk are accessed by the optical disk drive.

8. A method for accessing a variable memory of an optical disk drive comprising following steps:
   (a) utilizing the optical disk drive to read data of a DVD disk and identifying the type of the DVD disk;
   (b) if the type of the DVD disk is DVD-ROM, setting up variables at an address of a first area arranged in the variable memory according to the type of the DVD disk; and
   (c) if the type of the DVD disk is DVD-RAM, setting up variables at the address of the first area arranged in the variable memory according to the type of the DVD disk;
   wherein an arrangement of the variable memory is predetermined regardless of the type of the disk accessed by the optical disk drive.

9. The method of claim 8, further comprising:
   setting up common reading variables necessary for the optical disk drive to access the DVD disk into a second area arranged in the variable memory according to the type of the DVD disk;
   wherein the common reading variables set up in the variable memory will not be replaced when a different type optical disk is accessed by the optical disk drive.

10. The method of claim 8 wherein the variables are reading variables, and when the optical disk drive sets up the reading variables in step (b) or (c) in the variable memory, the reading variables replace reading variables of a last-inserted disk set up in the address of the first area arranged in the variable memory.

11. The method of claim 9 wherein the common reading variables include drive configuration, status, or tray status.

12. The method of claim 11 wherein the common reading variables set up in the variable memory will not be replaced when a plurality of optical disks following the optical disk are accessed by the optical disk drive.

13. A method for accessing a variable memory of an optical disk drive comprising following steps:
   (a) utilizing the optical disk drive to read and write data of an optical disk and identifying the type of the disk;
   (b) if the type of the disk is first recordable optical disk, setting up variables at a first address of a first area arranged in the variable memory according to the type of the disk; and
   (c) if the type of the disk is second recordable optical disk, setting up variables at the first address of the first area arranged in the variable memory according to the type of the disk;
   wherein an arrangement of the variable memory is predetermined regardless of the type of the disk accessed by the optical disk drive.

14. The method of claim 13 wherein the first recordable optical disk type comprises CD-R or CD-RW, and the second recordable optical disk type comprises DVD-R, DVD-RW, DVD+R, DVD+RW, or DVD-RAM.

15. The method of claim 13 wherein the variables are writing variables, and when the optical disk drive sets up the writing variables in step (b) or (c) in the variable memory, the writing variables replace writing variables of a last-inserted optical disk set up in the first address of the first area arranged in the variable memory.

16. The method of claim 13 further comprising:
   if the type of the disk is first recordable optical disk data, setting up reading variables at a second address of the first area arranged in the variable memory; and
   if the type of the disk is second optical disk data, setting up reading variables at the second address of the first area arranged in the variable memory.

17. The method of claim 16 wherein the first and second addresses are different.

18. The method of claim 13, further comprising:
   setting up common reading variables necessary for the optical disk drive to access the optical disk into a second area arranged in the variable memory according to the type of the disk;
   wherein the common reading variables set up in the variable memory will not be replaced when a different type optical disk is accessed by the optical disk drive.

19. The method of claim 3, wherein step (b) further comprises:
   if the type of the disk is first optical disk, reading a predetermined area on the optical disk to judge whether the optical disk is recordable; and
   if the optical disk is recordable, setting up writing variables at another address of the first area arranged in the variable memory; and
   step (c) further comprises:
   if the type of the disk is second optical disk, reading a predetermined area on the optical disk to judge whether the optical disk is recordable; and
   if the optical disk is recordable, setting up writing variables at the another address of the first area arranged in the variable memory.

* * * * *